US010422689B2

(12) United States Patent
Drzymala et al.

(10) Patent No.: US 10,422,689 B2
(45) Date of Patent: Sep. 24, 2019

(54) METHOD OF, AND ARRANGEMENT FOR, REDUCING WEIGHING ERRORS ASSOCIATED WITH A WEIGHING SCALE AT A CHECKOUT WORKSTATION

(71) Applicant: SYMBOL TECHNOLOGIES, LLC, Lincolnshire, IL (US)

(72) Inventors: Mark E. Drzymala, St. James, NY (US); Edward D. Barkan, Miller Place, NY (US); Darran M. Handshaw, Sound Beach, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 375 days.

(21) Appl. No.: 15/046,818

(22) Filed: Feb. 18, 2016

(65) Prior Publication Data

US 2017/0241829 A1 Aug. 24, 2017

(51) Int. Cl.
*G01G 21/28* (2006.01)
*G01G 21/22* (2006.01)
*G01G 19/414* (2006.01)

(52) U.S. Cl.
CPC ......... *G01G 21/28* (2013.01); *G01G 19/4144* (2013.01); *G01G 21/22* (2013.01)

(58) Field of Classification Search
CPC ..... G01G 19/4144; G01G 21/22; G01G 21/28
USPC .......... 73/1.13; 702/101, 173; 177/161, 163, 177/179, 180
See application file for complete search history.

(56) References Cited

U.S. PATENT DOCUMENTS

| 5,834,708 A | * | 11/1998 | Svetal | G01G 19/4144 177/180 |
| 2006/0131416 A1 | * | 6/2006 | Jwo | G01G 19/4144 235/454 |
| 2008/0023556 A1 | * | 1/2008 | Vinogradov | G06K 7/10722 235/462.42 |

* cited by examiner

*Primary Examiner* — Benjamin R Schmitt
(74) *Attorney, Agent, or Firm* — Yuri Astvatsaturov

(57) ABSTRACT

A weighing scale is provided at a product processing workstation having a horizontal bed for supporting a horizontal bed window and an upright raised tower for supporting an upright tower window. A platter is mounted on the scale for joint movement therewith. The platter has a horizontal platter portion at least partly overlying the horizontal bed, and an upright platter portion at least partly overlying the raised tower. A guard on the upright platter portion overlies parts of the workstation for reducing weighing errors associated with weighing a product on the scale. The guard prevents the product from contacting and resting on the parts of the workstation and from being erroneously weighed.

13 Claims, 6 Drawing Sheets

METHOD OF, AND ARRANGEMENT FOR, REDUCING WEIGHING ERRORS ASSOCIATED WITH A WEIGHING SCALE AT A CHECKOUT WORKSTATION

BACKGROUND OF THE INVENTION

The present disclosure relates generally to a point-of-transaction, checkout workstation through which retail products associated with electro-optically readable targets are passed and processed, and, more particularly, to an arrangement for, and a method of, reducing weighing errors associated with a weighing scale at the workstation.

In the retail industry, it is known to read targets, such as one-dimensional bar code symbols, particularly of the Universal Product Code (UPC) type, and two-dimensional bar code symbols, such as Quick Response (QR) codes, associated with, or borne on, retail products that are passed through, and processed by, a dual window, multi-plane, or bi-optical checkout workstation. The bi-optical workstation has a horizontal bed for supporting a generally horizontal window, and a raised tower for supporting a generally vertical or upright window. The workstation can have either laser-based or imager-based readers for reading the targets passed by, or presented to either or both windows, and is typically installed in a checkout counter. For products that are sold on the basis of their weight, such as fruits, vegetables, meats, cheeses, nuts, fish, bakery items, candies, etc., it is known to incorporate a weighing scale into the workstation. A horizontal platform of the scale supports the horizontal window. The scale measures the product weight, and a price of the product is calculated based on a unit weight price and the product weight measured by the scale. An operator typically looks up the unit weight price manually, either by touching a picture of the product on an adjacent touch screen at the workstation, or by referring to a printed list of the products and their corresponding unit weight prices. The corresponding unit weight price is manually entered via entry on an adjacent keyboard at the workstation, and the product price calculated automatically when the product is weighed. If the product bears an identifying symbol, then the symbol is automatically read by at least one of the readers; the corresponding unit weight price is automatically retrieved from a price database; and the product price calculated automatically when the product is weighed.

However, as advantageous as the use of such a scale has been, one concern relates to weighing errors. If the product to be weighed is bulky and oversized and overhangs an edge of the scale, an erroneous measurement may be returned by the scale. For example, if the product to be weighed partially rests on some surface or object other than the scale, such as the counter, or the upright window, or the raised tower, or a nearby keyboard, cash register, card reader, or like device, then the scale may return a lower weight, thereby resulting in the customer being undercharged for the product and a monetary loss for the retailer.

The art has proposed using light sensors to detect when an oversized product overhangs the scale onto the counter, and then alerting an operator to reposition the product. However, this repositioning action may or may not be possible, or an operator may disregard the alert, thereby resulting in an underweight being measured. The art has also proposed placing an L-shaped platter on the workstation for movement with the scale. The platter has an upright windowed panel that overlies the horizontal window, and an upright windowed panel that overlies the upright window. Although a correct weight is measured when the product only contacts the platter, an erroneous weight measurement will still result if the product extends beyond the platter and contacts some other surface or object, such as the raised tower, or a nearby keyboard, cash register, card reader, or like device.

Accordingly, the need persists to reduce weighing errors of a product being weighed on a weighing scale at a retail checkout workstation to prevent undercharging the customer and monetary loss for the retailer.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
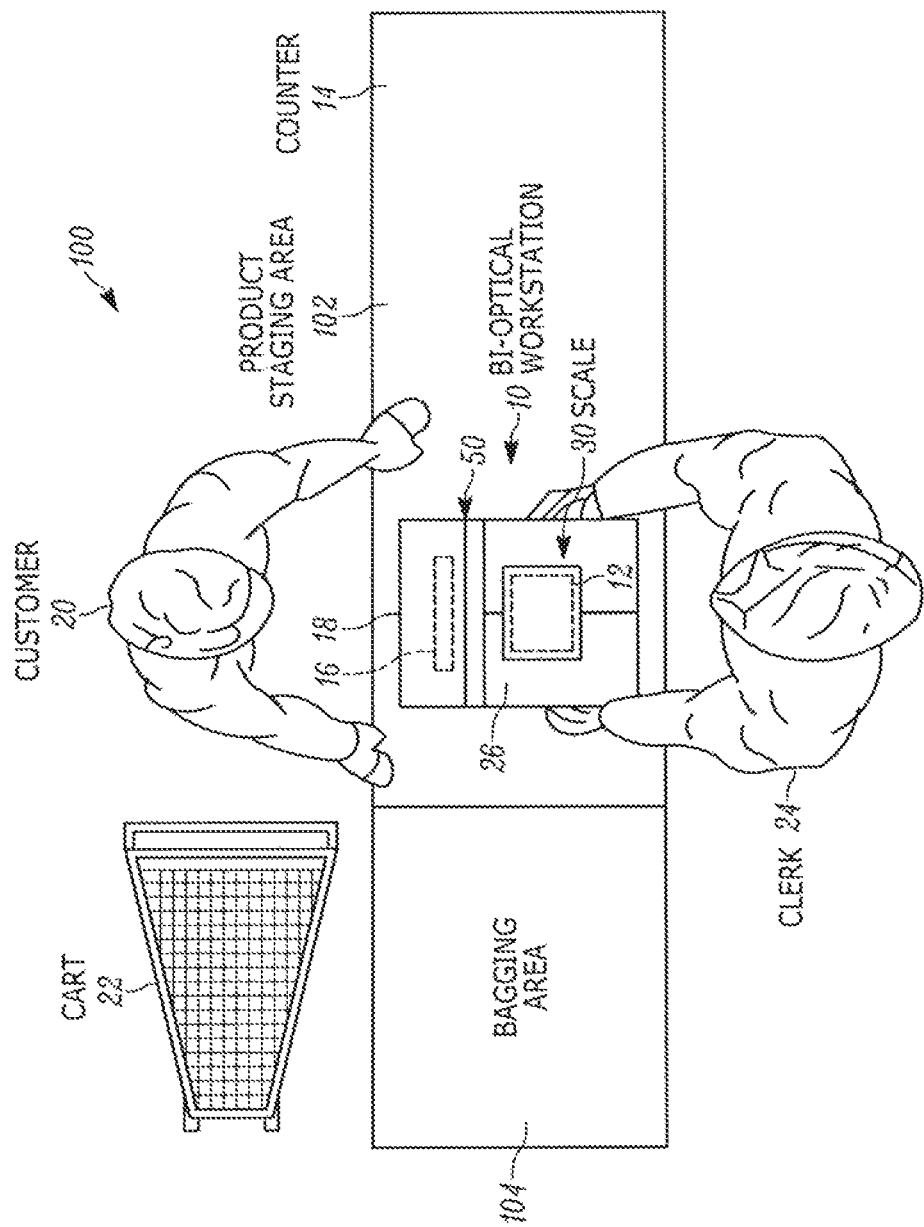
FIG. 1 is a top plan view of a weighing scale incorporated into a bi-optical workstation installed in a retail checkout counter, the scale being operative for measuring accurate product weights in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and arrangement components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure generally relates to an arrangement for reducing weighing errors associated with weighing a product on a weighing scale at a product processing workstation having a horizontal bed for supporting a generally horizontal bed window, and an upright raised tower for supporting a generally vertical or upright tower window. The arrangement includes a platter mounted on the scale for joint movement therewith. The platter has a horizontal platter portion at least partly overlying the horizontal bed, and an upright platter portion at least partly overlying the raised tower. The upright platter portion has an upper rail elongated along an advancement direction along which the product is passed through the workstation. The arrangement also includes a guard on the upper rail. The guard extends past the upper rail to prevent the product from contacting and resting on parts of the workstation other than the scale and from being erroneously weighed.

Preferably, the upright platter portion may be configured as a generally rectangular frame, and includes an upright platter window bounded by, and supported in, the frame. The upright platter portion may also be configured as a generally rectangular, windowless frame. In one embodiment, the guard extends along the advancement direction. In another embodiment, the guard may extend in opposite directions past the upper rail. The guard may be detachably or removably mounted on the upper rail, or may be fixed and integral with the upper rail. Advantageously, the guard is an L-shaped bracket having one leg at least partly overlying an upper face part of the upright raised tower, and another leg at least partly overlying an upper top part of the upright raised tower. In still another embodiment, the guard may extend upwardly in a direction generally perpendicular to the advancement direction past the raised tower to prevent the product from contacting and resting on a surface or object located above the raised tower.

Still another aspect of the present disclosure relates to a method of reducing weighing errors associated with weighing a product on a weighing scale at a product processing workstation having a horizontal bed for supporting a generally horizontal bed window, and an upright raised tower for supporting a generally vertical or upright tower window. The method is performed by mounting a platter on the scale for joint movement therewith, by at least partly overlying the horizontal bed with a horizontal platter portion of the platter, and by at least partly overlying the raised tower with an upright platter portion of the platter. The method is further performed by configuring the upright platter portion with an upper rail elongated along an advancement direction along which the product is passed through the workstation, by providing a guard on the upper rail, and by extending the guard past the upper rail to prevent the product from contacting and resting on parts of the workstation other than the scale and from being erroneously weighed.

In accordance with this disclosure, the guard prevents an erroneous weight measurement which would otherwise result if the product being weighed extended beyond the platter and contacted some other surface or object, such as the raised tower, or a nearby keyboard, cash register, card reader, or like device. An accurate weight measurement prevents undercharging the customer and monetary loss for the retailer.

Figure 2:
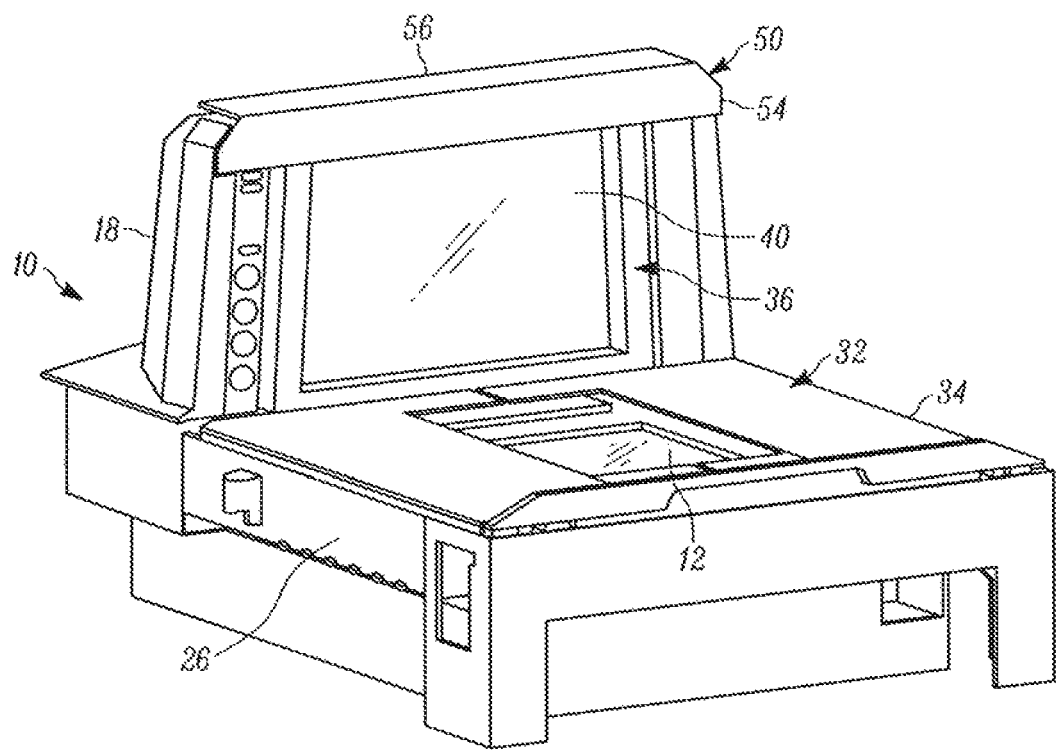
FIG. 2 is a perspective view of the workstation of FIG. 1 in isolation, together with one embodiment of an arrangement for reducing weighing errors associated with the scale at the workstation.
Figure 3:
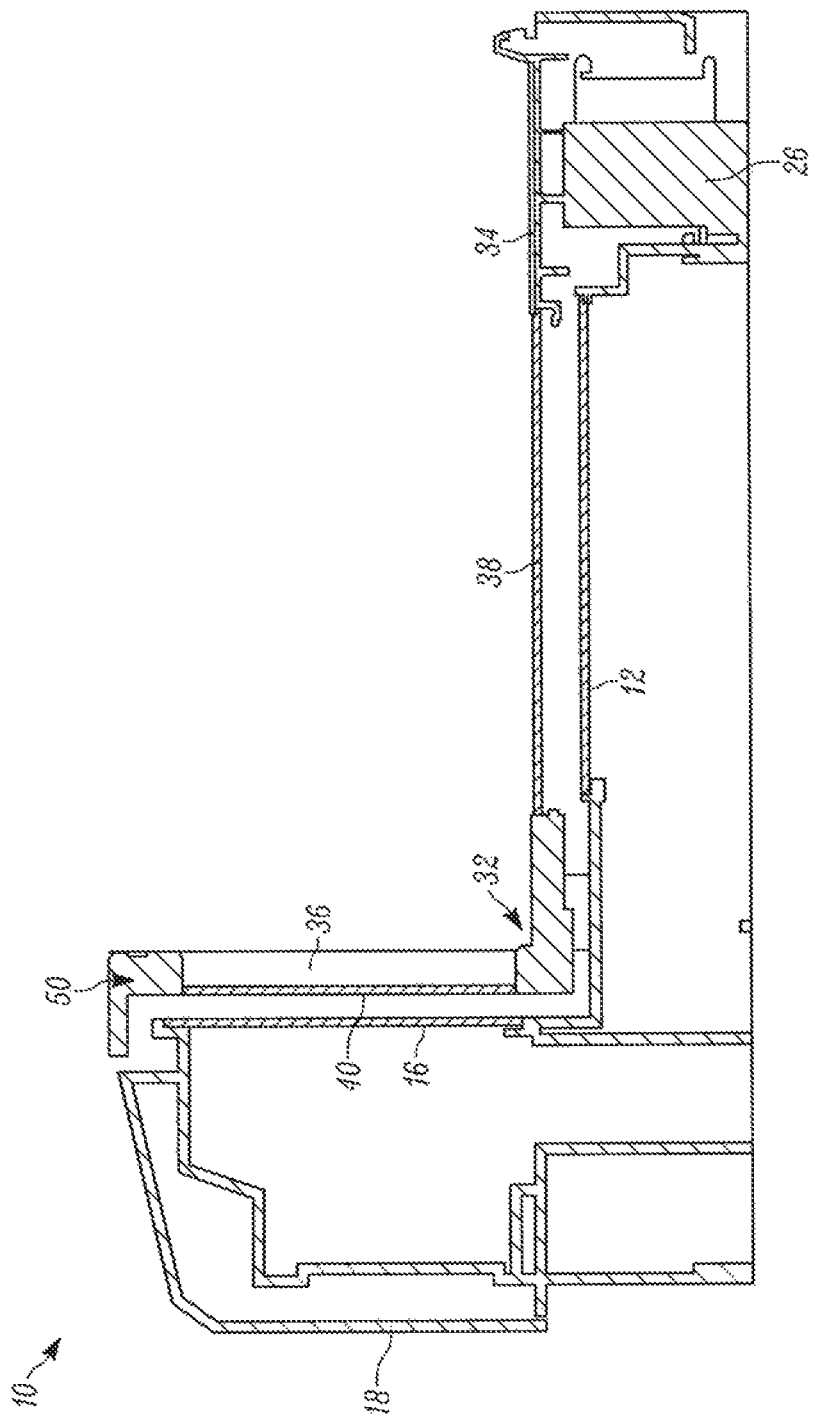
FIG. 3 is a sectional view though the workstation and arrangement of FIG. 2.

Turning now to the drawings, a retail checkout 100, as depicted in FIG. 1, includes a dual window, multi-plane, bi-optical, point-of-transaction, retail workstation 10 used by retailers at a retail checkout counter 14 in an aisle to process transactions involving the purchase of retail products associated with, or bearing, an identifying target, such as the UPC symbol described above. In a typical retail venue, a plurality of such workstations 10 is arranged in a plurality of checkout aisles. As best seen in FIG. 2-3, the workstation 10 has a generally horizontal, planar, bed window 12 supported by a horizontal bed 26. The bed window 12 is either elevated, or set flush, with the counter 14. A vertical or generally vertical, i.e., slightly tilted, (referred to as "upright" hereinafter) planar, tower window 16 is set flush with, or, as shown, recessed into, a raised tower portion 18 above the counter 14. The workstation 10 either rests directly on the counter 14, or preferably, rests in a cutout or well formed in the counter 14.

Both the bed and tower windows 12, 16 are typically positioned to face and be accessible to a clerk 24 (FIG. 1) standing at one side of the counter 14 for enabling the clerk 24 to interact with the workstation 10. A keyboard 28 (see FIG. 6) may also be provided above the workstation 10 to enable manual entry of information, such as an identifying code for any purchased product not bearing a symbol, by the clerk 24. Alternately, in a self-service checkout, the bed and tower windows 12, 16 are typically positioned to face and be accessible to a customer 20.

A product staging area 102 is located on the counter 14 at one side of the workstation 10. The products are typically placed on the product staging area 102 by the customer 20 standing at the opposite side of the counter. The customer 20 typically retrieves the individual products for purchase from a shopping cart 22 or basket for placement on the product staging area 102. A non-illustrated conveyor belt could be employed for conveying the products to the clerk 24.

The workstation 10 has a data capture arrangement, for example, a plurality of imaging readers, each including a solid-state imager for capturing light passing through either or both windows 12, 16 from a target that can be a one- or two-dimensional symbol. In typical use, the clerk 24 processes each product bearing a UPC symbol thereon, past the windows 12, 16 by swiping the product across a respective window, or by presenting the product by holding it momentarily steady at the respective window, before passing the product to a bagging area 104 that is located at the opposite side of the workstation 10. The symbol may be located on any of the top, bottom, right, left, front and rear, sides of the product, and at least one, if not more, of the imagers will capture the light returning from the symbol through one or both windows 12, 16 as an image.

FIG. 1 also schematically depicts that a weighing scale 30 is incorporated in the workstation 10. Typically, the bed window 12 is mounted in, and supported by, a platform of the scale 30. As described above, the scale 30 is used to weigh those products, such as fruits, vegetables, meats, cheeses, nuts, fish, bakery items, candies, etc., whose price is a function of their weight. The scale 30 measures the product weight, and a price of the product is calculated based on a unit weight price and the product weight measured by the scale 30. The clerk 24 typically looks up the unit weight price manually, either by touching a picture of the product on an adjacent touch screen at the workstation 10, or by referring to a printed list of the products and their corresponding unit weight prices. The corresponding unit weight price is manually entered via entry on the keyboard 28 at the workstation 10, and the product price calculated automatically when the product is weighed. If the product bears an identifying symbol, then the symbol is automatically read by at least one of the readers; the corresponding unit weight price is automatically retrieved from a price database; and the product price calculated automatically when the product is weighed.

However, if the product to be weighed is bulky and oversized and overhangs an edge of the scale 30, an erroneous measurement may be returned by the scale 30. For example, if the product to be weighed partially rests on some surface or object other than the scale 30, such as the counter 14, or the upright tower window 16, or the raised tower 18, or the nearby keyboard 28, cash register, card reader, or like device, then the scale 30 may return a lower weight, thereby resulting in the customer 20 being undercharged for the product and a monetary loss for the retailer. One aspect of this disclosure is to reduce such weighing errors by providing various embodiments of a guard 50 on a platter 32 to prevent such contact between the product and such other surfaces or objects.

In a first embodiment, as shown in FIGS. 2-3, the platter 32 is mounted on the scale 30 for joint movement therewith. The platter 32 has a generally planar, horizontal platter portion 34 at least partly overlying the horizontal bed 26, and an upright platter portion 36 at least partly overlying the raised tower 18. The platter portions 34, 36 constitute a single component. A generally planar, horizontal platter window 38 is mounted in, and supported by, the horizontal platter portion 34 in a plane generally parallel to, and spaced away from, the bed window 12. A generally planar, upright platter window 40 is mounted in, and supported by, the upright platter portion 36 in a plane generally parallel to, and spaced away from, the tower window 16.

Figure 4:
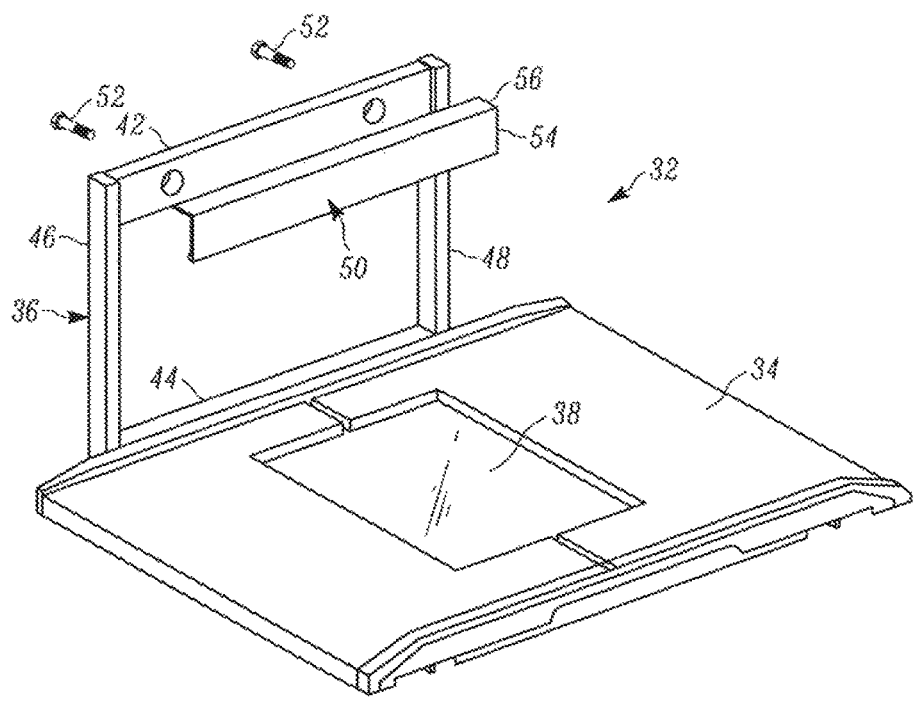
FIG. 4 is a partially-exploded, left side, perspective view of another embodiment of an arrangement in isolation for reducing weighing errors associated with the scale at the workstation of FIG. 1.
Figure 5:
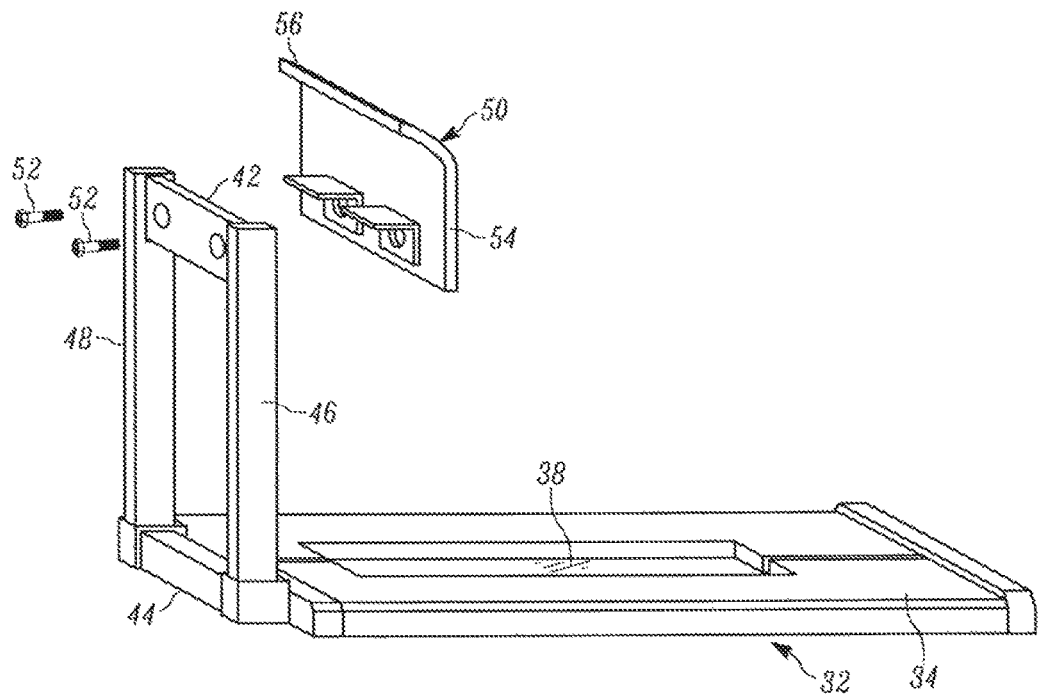
FIG. 5 is a partially-exploded, perspective view of the embodiment of the arrangement of FIG. 4, as seen from behind.
Figure 6:
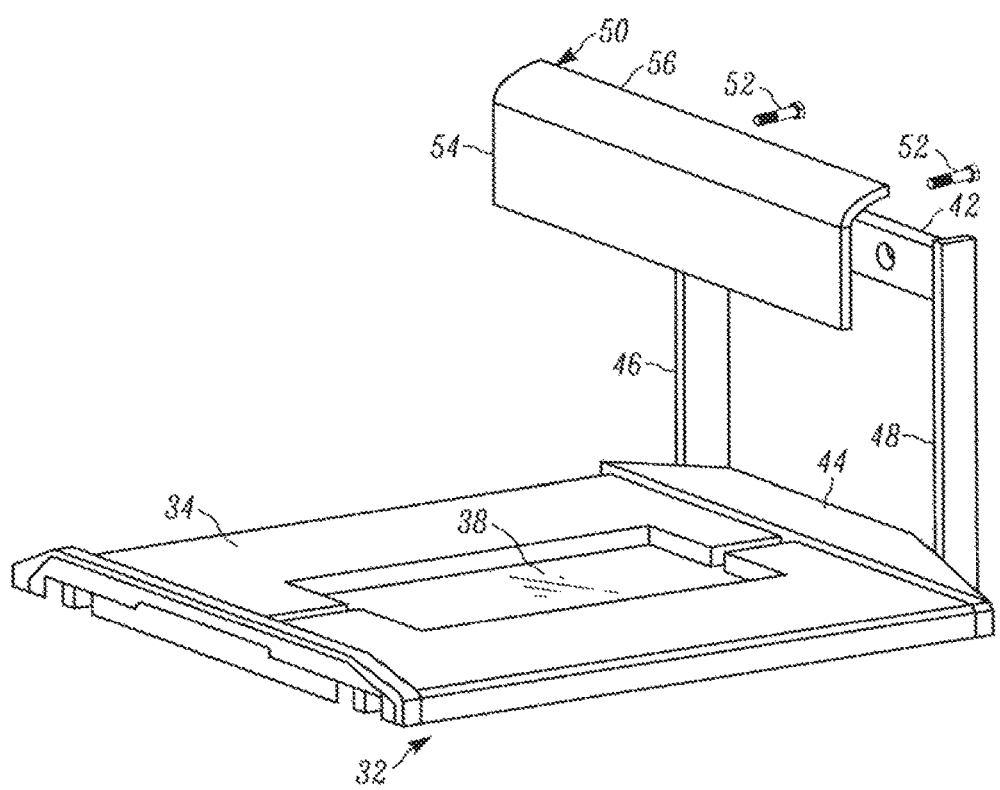
FIG. 6 is a partially-exploded, perspective view of the embodiment of the arrangement of FIG. 4, as seen from the right side.

As best seen in the second embodiment of FIGS. 4-6, the upright platter portion 36 is advantageously configured as a generally rectangular frame having a generally horizontal upper rail 42, a generally horizontal lower rail 44, and a pair of upright side rails 46, 48. The upper and lower rails 42, 44 are each elongated along the width of the workstation, i.e., along the horizontal or advancement direction along which the products generally travel and advance through the workstation 10. In the first embodiment of FIGS. 2-3, the upright platter window 40 is mounted in the frame. The presence of the upright platter window 40 is advantageous to prevent the product from directly contacting the tower window 16. However, in the second embodiment of FIGS. 4-6, the frame is windowless and, thus, the upright platter window 40 is an optional feature. The absence of the upright platter window 40 is advantageous, because there is no upright platter window 40 to periodically clean, or be replaced if scuffed or scratched during use. Eliminating the upright platter window 40 also results in less weight being exerted on a load cell of the scale, thereby making the load cell easier to calibrate and produce. Additional benefits derived from eliminating the upright platter window 40 include elimination of reflections off a secondary window that complicate the optical design, better overall light transmission than is possible with a double window, and reduction of signal loss and illumination power requirements. With the windowless frame, the possibility exists that the product might directly contact the tower window 16. This is less likely to occur when the tower window 16 is, as described above, recessed into the raised tower 18, thereby making it less likely that the product can protrude through the opening in the windowless frame far enough to touch the recessed tower window 16.

In all embodiments, the guard 50 is provided on the upright platter portion 36 and, more particularly, on the upper rail 42. The guard 50 overlies parts of the workstation 10 to prevent the product from contacting and resting on such parts of the workstation 10, other than the scale 30. As shown in FIGS. 4-6, the guard 50 is detachably or removably mounted on the upper rail 42 with the aid of threaded fasteners 52. Fasteners other than the illustrated threaded fasteners can be used. For example, snap-type fasteners may be employed. As shown in FIGS. 2-3, the guard 50 is integral, of a one-piece construction, and fixed, with the upper rail 42.

Preferably, the guard 50 is an L-shaped bracket having one leg 54 at least partly overlying an upper, forwardly-facing, front part or region of the upright raised tower 18, and another leg 56 at least partly overlying an upper, upwardly-facing, top part of the upright raised tower 18. Thus, the product is blocked from directly contacting both the upper front and top parts of the raised tower 18. As shown in FIGS. 4-6, the guard 50 extends over the length of the upper rail 42. As shown in FIGS. 2-3, the guard 50 extends in opposite directions past the upper rail 42 and covers the entire width of the raised tower 18 to overlie an upper part of the raised tower 18, while not overlying other parts of the raised tower 18. Such other parts may support speakers or beepers, light sensors, control buttons, and the like, whose operation would be impaired if they were blocked by the guard 50.

Figure 7:
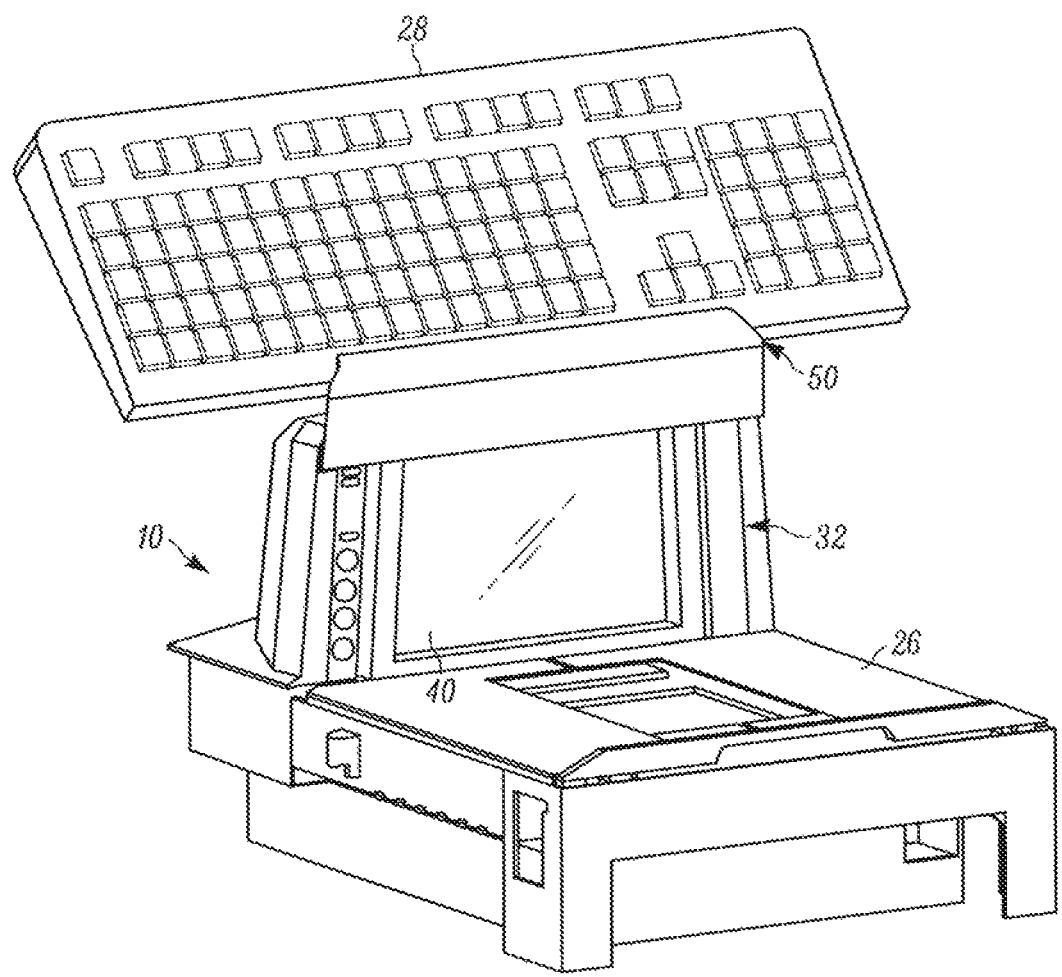
FIG. 7 is a perspective view of still another embodiment of an arrangement for reducing weighing errors associated with the scale at the workstation of FIG. 1.

In the third embodiment of FIG. 7, the guard 50 extends not only in opposite directions past the upper rail 42, but also upwardly in a direction generally perpendicular to the advancement direction past the raised tower 18 to prevent the product from contacting and resting on the keyboard 28 located above the raised tower 18. The guard 50 is positioned in front of the keyboard 28 and does not interfere therewith when the platter 32 is removed from the workstation 10 for cleaning. The keyboard 28 is positioned below an upper edge of the guard 50, and thus is located closer to the counter 14 than if the keyboard 28 were positioned above the guard 50. This allows the clerk 24 to more easily access the keyboard 28 even when seated. Since the guard 50 extends upwards in front of a front edge of the keyboard 28, the keyboard 28 can be placed low down close to the top of the raised tower 18 where the keyboard 28 can be easily reached by a seated clerk 24. Most stores in Europe and some in the United States utilize seated clerks 24, because it is felt they are more productive that way. Thus, by locating the keyboard 28 as low as possible, it is easier for seated clerks 24 to access and use the keyboard 28, and the keyboard 28 is thus made more ergonomically friendly to seated clerks 24.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for reducing weighing errors associated with weighing a product on a weighing scale at a product processing workstation having a horizontal bed for supporting a generally horizontal bed window and an upright raised tower for supporting a generally upright tower window, the arrangement comprising:
   a platter mounted on the scale for joint movement therewith, the platter having a horizontal platter portion at least partly overlying the horizontal bed, and an upright platter portion at least partly overlying the raised tower, the upright platter portion having an upper rail elongated along an advancement direction along which the product is passed through the workstation, the upper rail having a top surface and a front surface, the front surface facing an area above the horizontal platter portion; and
   a guard detachably mounted to the upper rail, the guard covering the front surface and the top surface, the guard extending past the upper rail along the advancement direction.

2. The arrangement of claim 1, wherein the guard is detachably mounted on the upper rail via treaded fasteners, each of the threaded fasteners passing through a respective aperture in the upper rail.

3. The arrangement of claim 1, wherein the guard is an L-shaped bracket having one leg at least partly overlying an upper face part of the raised tower, and another leg at least partly overlying an upper top part of the raised tower.

4. The arrangement of claim 1, wherein the upright platter portion includes a generally rectangular frame, and an upright platter window bounded by, and supported in, the frame.

5. The arrangement of claim 1, wherein the tower window is recessed in the raised tower, wherein the upright platter portion includes a generally rectangular, windowless frame, and wherein the generally rectangular, windowless frame is spaced away from the recessed tower window.

6. The arrangement of claim 1, wherein the guard extends upwardly in a direction generally perpendicular to the advancement direction past the raised tower to prevent the product from contacting and resting on a surface or object located above the raised tower.

7. A method of reducing weighing errors associated with weighing a product on a weighing scale at a product processing workstation having a horizontal bed for supporting a generally horizontal bed window and an upright raised tower for supporting a generally upright tower window, the method comprising:
   mounting a platter on the scale for joint movement therewith by at least partly overlying the horizontal bed with a horizontal platter portion of the platter, and by at least partly overlying the raised tower with an upright platter portion of the platter;
   configuring the upright platter portion with an upper rail elongated along an advancement direction along which the product is passed through the workstation, the upper rail having a top surface and a front surface, the front surface facing an area above the horizontal platter portion; and
   detachably mounting a guard to the upper rail, the guard covering the front surface and the top surface, the guard extending past the upper rail to prevent the product from contacting and resting on parts of the workstation other than the scale and from being erroneously weighed.

8. The method of claim 7, where the guard is detachably mounted on the upper rail via treaded fasteners, each of the threaded fasteners passing through a respective aperture in the upper rail.

9. The method of claim 7, and extending the guard past the upper rail to overlie an upper part of the raised tower.

10. The method of claim 7, and configuring the guard as an L-shaped bracket having one leg at least partly overlying an upper face part of the upright raised tower, and another leg at least partly overlying an upper top part of the upright raised tower.

11. The method of claim 7, and configuring the upright platter portion as a generally rectangular frame, and with an upright platter window bounded by, and supported in, the frame.

12. The method of claim 7, and recessing the tower window in the raised tower, configuring the upright platter portion as a generally rectangular, windowless frame, and spacing the generally rectangular, windowless frame away from the tower window.

13. The method of claim 7, and extending the guard upwardly in a direction generally perpendicular to the advancement direction past the raised tower to prevent the product from contacting and resting on a surface or object located above the raised tower.

\* \* \* \* \*